United States Patent
Souders et al.

(10) Patent No.: US 7,779,216 B2
(45) Date of Patent: Aug. 17, 2010

(54) METHOD AND SYSTEM OF RANDOMIZING MEMORY LOCATIONS

(75) Inventors: Keith A. Souders, Tampa, FL (US); Jamal Haque, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 546 days.

(21) Appl. No.: 11/734,139

(22) Filed: Apr. 11, 2007

(65) Prior Publication Data

US 2008/0256290 A1 Oct. 16, 2008

(51) Int. Cl.
G06F 12/00 (2006.01)
(52) U.S. Cl. ............... 711/157; 711/E12.079; 365/230.03; 365/230.04
(58) Field of Classification Search .......... 711/157, 711/E12.079
See application file for complete search history.

(56) References Cited

U.S. PATENT DOCUMENTS

| | | | | |
|---|---|---|---|---|
| 4,120,048 | A | | 10/1978 | Fuhrman |
| 4,589,067 | A | * | 5/1986 | Porter et al. .................. 712/9 |
| 5,675,549 | A | * | 10/1997 | Ong et al. ................ 365/233.5 |
| 6,202,133 | B1 | * | 3/2001 | Jeddeloh ..................... 711/157 |
| 7,003,643 | B1 | * | 2/2006 | Penney et al. ............... 711/167 |
| 7,469,365 | B2 | * | 12/2008 | Kawahara et al. ........... 714/701 |
| 7,593,494 | B1 | * | 9/2009 | Ghobrial et al. ............. 375/350 |
| 2002/0054535 | A1 | | 5/2002 | Arcoleo et al. |
| 2006/0095694 | A1 | * | 5/2006 | Hsieh et al. ................ 711/157 |
| 2007/0266187 | A1 | * | 11/2007 | Senoo ........................ 710/26 |

OTHER PUBLICATIONS definition of "disburse", The American Heritage Dictionary, fourth ed., 2009, Houghton Mifflin Company.*
definition of "disperse", The American Heritage Dictionary, fourth ed., 2009, Houghton Mifflin Company.*

* cited by examiner

*Primary Examiner*—Matt Kim
*Assistant Examiner*—John P Fishburn
(74) *Attorney, Agent, or Firm*—Fogg & Powers LLC

(57) ABSTRACT

A memory system that disperses memory addresses of strings of data throughout a memory is provided. The memory system includes a memory, a central processing unit (CPU) and an address randomizer. The memory is configured to store strings of data. The CPU is configured to direct the storing and retrieving of the strings of data from the memory at select memory addresses. The address randomizer is coupled between the CPU and the memory. Moreover, the address randomizer is configured to disburse the strings of data throughout locations of the memory by changing the select memory addresses directed by the CPU.

18 Claims, 4 Drawing Sheets

METHOD AND SYSTEM OF RANDOMIZING MEMORY LOCATIONS

BACKGROUND

A commercial off the shelf (COTS) memory used to store data is susceptible to radiation events such as radiation from solar flares. Although, the radiation event may only affect part of the memory, data stored in the affected area will be lost or corrupted. Radiation hardened or tolerant devices could be used to resolve this problem. However, the cost of radiation hardened devices may be prohibitive and the performance of radiation hardened and tolerant devices may not be up to the performance requirements of the targeted applications.

For the reasons stated above and for other reasons stated below which will become apparent to those skilled in the art upon reading and understanding the present specification, there is a need in the art for an effective and efficient method of dealing with localized radiation events that affect strings of data.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a memory system is provided. The memory system includes a memory, a central processing unit (CPU) and an address randomizer. The memory is configured to store strings of data. The CPU is configured to direct the storing and retrieving of the strings of data from the memory at select memory addresses. The address randomizer is coupled between the CPU and the memory. Moreover, the address randomizer is configured to disburse the strings of data throughout locations of the memory by changing the select memory addresses directed by the CPU.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide memory systems and methods that store related data (strings of data) in different physical locations throughout the real estate of a memory. Hence, if a localized radiation event occurs that only affects a limited physical area of the memory, only a limited amount of the related data has a chance of becoming lost or corrupt. If the limited amount of lost or corrupted data is insignificant it may just be treated as noise and no additional processing needs to take place to clear it out. Moreover, if processing needs to take place to fix the lost or corrupted data, known corrections algorithms can be implemented on single data bit/byte/word rather than large block of corrupted data. In some embodiments a dynamic address randomizer is used to spread out the related data throughout the memory. Moreover, in some embodiments, the address randomizer is transparent to the processor. Besides providing an effective and efficient means for dealing with minor radiation events, embodiments of the present invention provide a level of security for sensitive data by randomly scrambling the locations of related data throughout physical locations within the memory. The scrambling of the addresses of related data hampers its recreation by unauthorized parties. Moreover, embodiments allow for the use of COTS memories in a space environment, thus reducing cost while improving performance.

Figure 1:
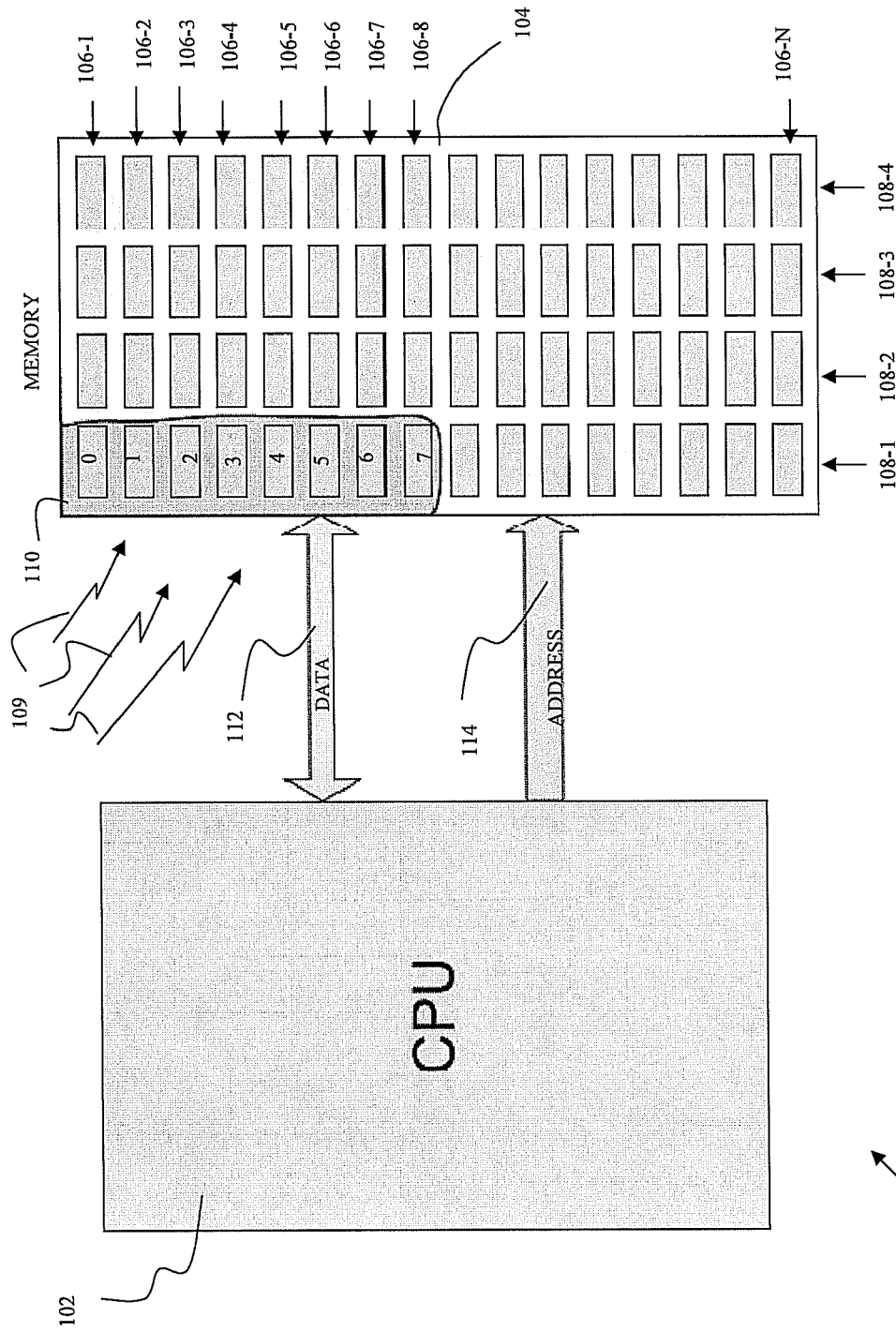
FIG. 1 is a block diagram of a memory system of the prior art.

To provide further background, FIG. 1 illustrates a block diagram of a memory system 100 of the prior art. The memory system includes a central processing unit (CPU) 102 and a memory 104. The CPU 102 stores and retrieves data from the memory 104 via data link 112. The address the data is stored and retrieved from is provided by the address link 114. Example memory addresses in memory 104 are provided for illustration purposes. The memory addresses in this example are given by columns 108-1 through 108-4 and rows 106-1 through 106-N. FIG. 1 illustrates an example of a typical storing of related data in a sequential fashion. The related data is illustrated as data bits 0 through 7. Data bit 0 is stored in address 108-1, 106-1, data bit 1 is stored in address 108-1, 106-2, Data bit 2 is stored in address 108-1, 106-3, Data bit 3 is stored in address 108-1, 106-4, Data bit 4 is stored in address 108-1, 106-5, Data bit 5 is stored in address 108-1, 106-6, Data bit 6 is stored in address 108-1, 106-7, and Data bit 7 is stored in address 108-1, 106-8.

The memory 104 is subject to a radiation event 109 that affects a localized portion 110 of memory 104. The data bits in the affected portion 110 are corrupted or lost by the radiation event. Since, the related date bits 0 through 7 (arrays or strings of data) were stored sequentially in the affected portion 110, all the related data is lost or corrupted.

Figure 2:
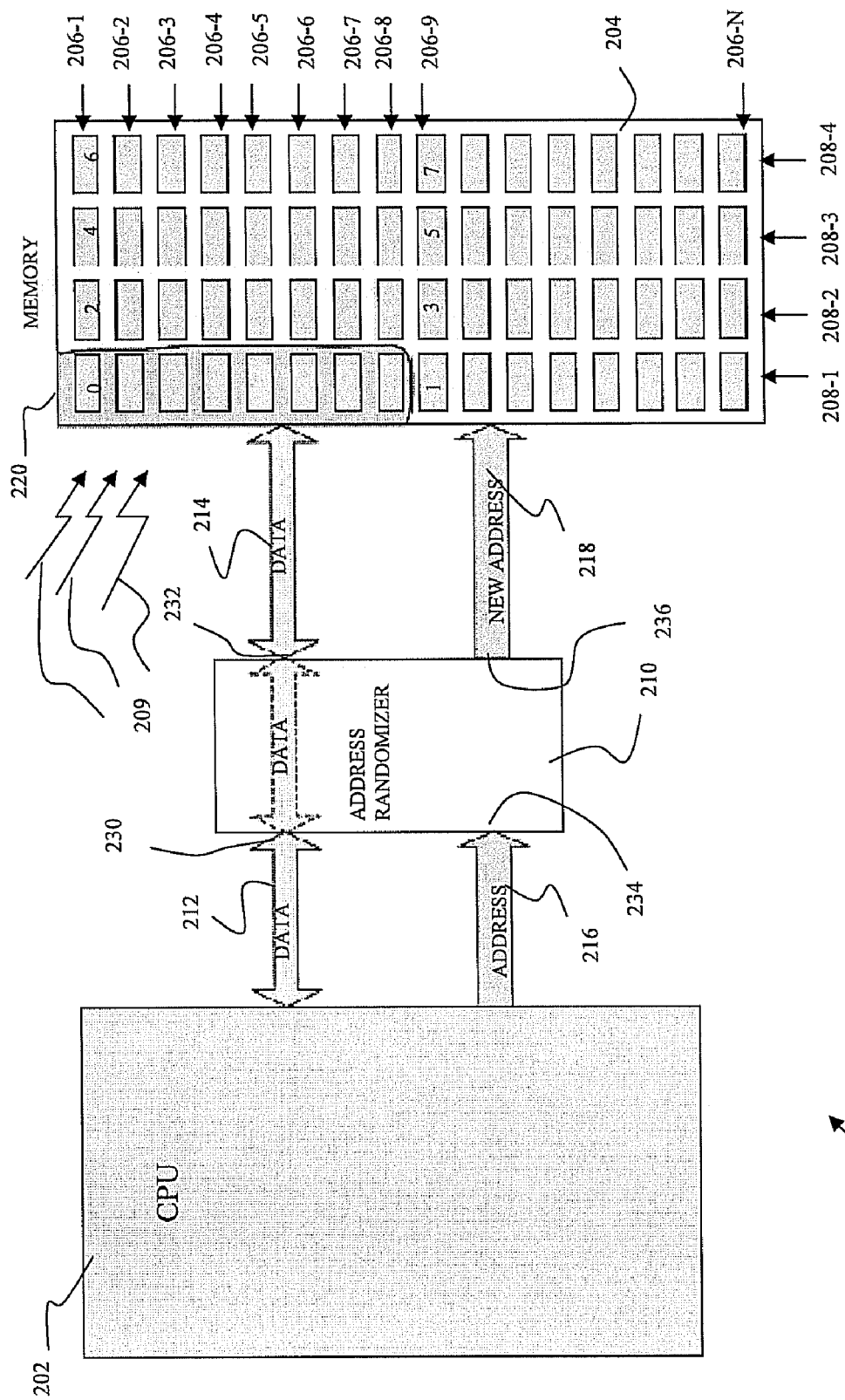
FIG. 2 is a block diagram of a memory system of one embodiment of the present invention.

FIG. 2 is a block diagram of a memory system 200 of one embodiment of the present invention. The memory system 200 includes a CPU 202, a memory 204 and an address randomizer 210. The address randomizer 210 randomly distributes related data throughout the physical memory 204. As illustrated, the data is stored and retrieved via CPU data link 212. The address the data is to be stored at or retrieved from is provided via the CPU address line 216. Unlike the prior art, however, the CPU data link 212 and the CPU address link 216 are coupled to the randomizer 210. In particular, the CPU data link 212 is coupled to a first data port 230 of the randomizer 210 and the CPU address link 216 is coupled to a first address port of the randomizer 210. The randomizer 210 passes the data along to the memory via second data port 232 and a randomizer data link 214. The randomizer 210 generates new addresses to store the related data. The new addresses are provided via second address port 236 and a random address link 218. In embodiments of the present invention the addresses used to store the related data by the randomizer 210 is transparent to the CPU 202. That is, the CPU 202 believes it is storing and retrieving the related data from the addresses it designated.

In some embodiments, the randomizer 210 dynamically randomizes the addresses to spread the related data throughout the memory. This not only protects against loss of data due to a localized event, such as a localized radiation event, but also provides a layer of security. In embodiments, the address randomizer 210 uses a dispersion algorithm. The dispersion algorithm can implement any number of different methods to generate an address including but limited to, interleaving, scrambling and organized randomization. The dispersion algorithm is predictable so that addressing to recall data can be achieved. Further in embodiments, the addressing can be set to "standard" allocation for a single data or specific blocks of data. Moreover, in some embodiments dynamic addressing is used that takes account for any and all address/data timing.

As FIG. 2 illustrates, the address randomizer 210 disburses the related data through out the memory 204. In particular, in this example, data bits 0, 2, 4, 6 are stored in row 206-1 and data bits 1, 3, 5, 7 are stored in row 206-9. In this randomization example a simple increment of 8 dispersion algorithm is enacted after each store data. As a result of the dispersion, a localized radiation event, such as radiation event 209 that only affects a portion 220 of the memory 204 affects a limited amount of the related data. In fact in this example only data bit 0 has been affected. Hence, an error correction algorithm only need to process a single data bit or the corrupted bit may simply be treated as noise. In particular, if the related data was an image, the results of a disruption as illustrated in FIG. 2 may look like acceptable noise since the data errors were dispersed over the entirety of the image rather than a single large mass of disrupted pixels. Even if a correction algorithm was employed, the delay in correction as a result of single bit/byte/word errors are minimal compared to a whole block of large data needing to be corrected.

Figure 3:
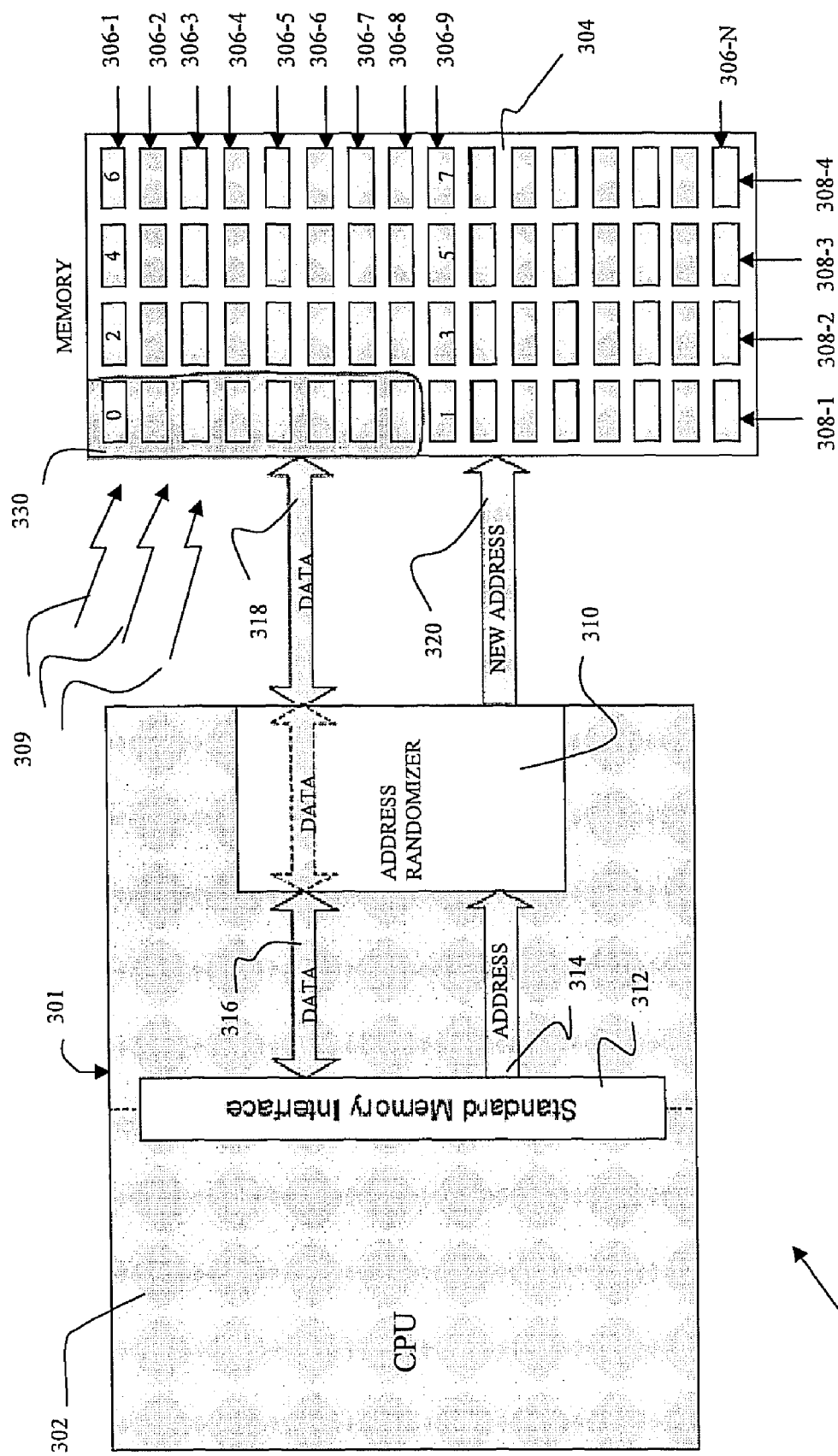
FIG. 3 is a block diagram of another memory system of another embodiment of the present invention.

Referring to FIG. 3, a block diagram of another memory system 300 of one embodiment is provided. The memory system 300 includes a processing system 301 and a memory 304. The memory 304 includes memory addresses illustrated by columns 308-1 through 308-N and columns 306-1 through 306-N. As in the above example, the address randomizer 310 disburses related data throughout the memory 304. In this example, data bits 0, 2, 4, and 6 are respectfully stored in row 306-1 and data bits 1, 3, 5, and 7 are respectfully stored in row 309-9. Similar to example of FIG. 2, the radiation event 309 of FIG. 3 only affects a portion 330 of the memory 304. Because of the disbursal of the related data, only data bit 0 is affected by the radiation event.

The processing system 301 includes a CPU 302, a standard memory interface 312 and the address randomizer 310. As illustrated, in this embodiment, the address randomizer 310 is internal to the processing system 301. In one internal embodiment, the address randomizer 310 is part of a direct memory access (DMA) engine. As further illustrated in FIG. 3, the CPU 302 sends data to and retrieves data from the memory via a path including the standard memory interface 312, a CPU data link 316, and a randomizer data link 318. The CPU 302 provides and requests addresses associated with the data via the standard interface 312 and a CPU address link 314. The CPU address link 314 passes memory addresses generated by the CPU. The address randomizer 310 randomizes the CPU address. The randomized address is passed by the random address link 320 to the memory 304.

Figure 4:
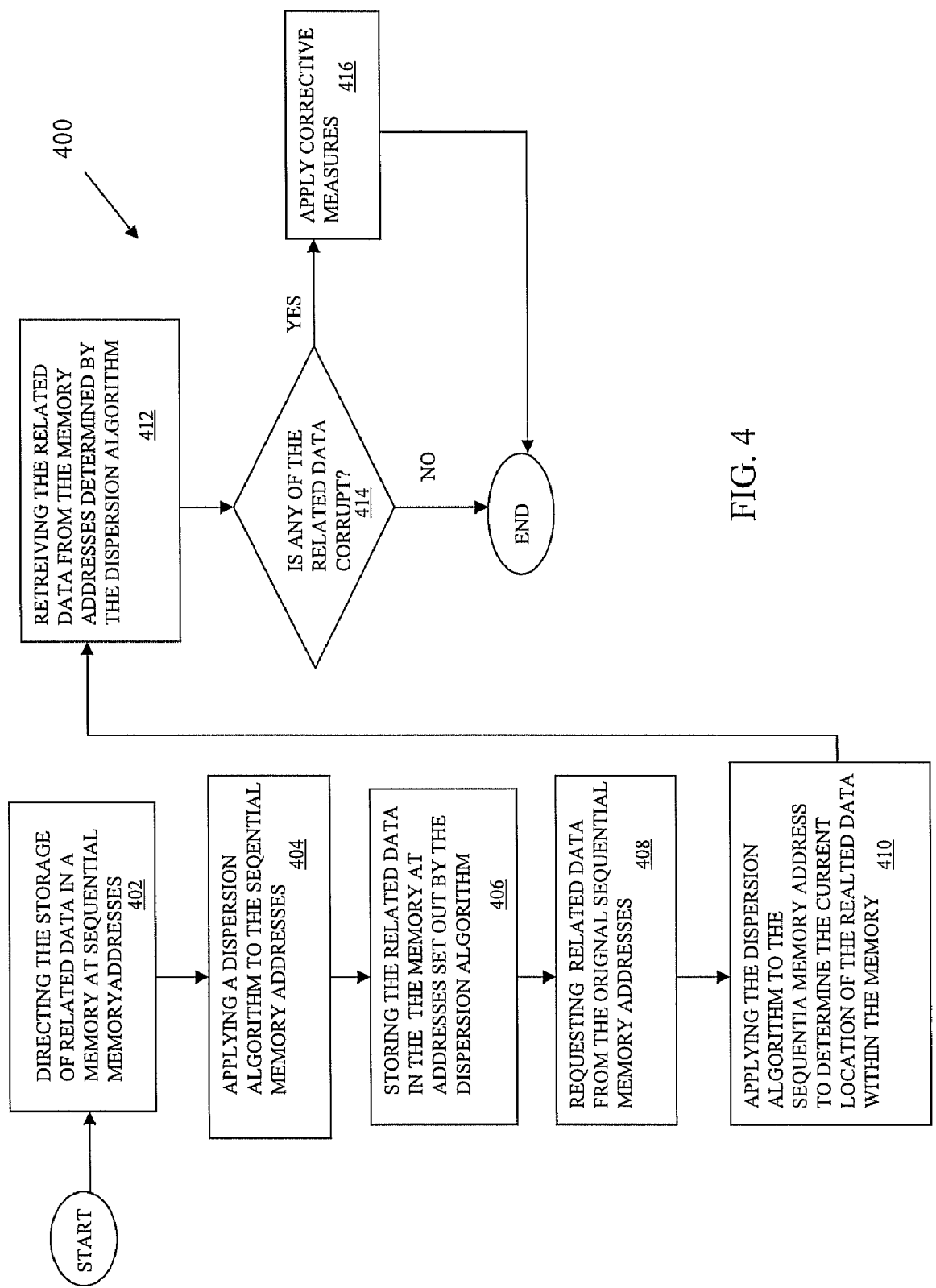
FIG. 4 is a flow diagram of an implementation method of one embodiment of the present invention.

Referring to FIG. 4, an implementation flow diagram 400 of one embodiment is illustrated. As shown, the process starts when a process or directs a string of data (related data) to be stored in a memory (402). Although, the memory addresses in this example are sequential, that does not have to be the case. The memory addresses are then applied to a dispersion algorithm (404). The dispersion algorithm disburses the memory addresses throughout the memory so that localized events, such as localized radiation events, can only affect a relatively small amount of the related data. The related data is then stored in the memory at the addresses determined by the dispersion algorithm (406). In embodiments the dispersion algorithm is part of the address randomizer.

When the related data is needed, the processor requests its retrieval at the original memory addresses (408). Hence, the processor in some embodiments does not know the memory addresses have been changed. The original memory addresses are then applied again to the dispersion algorithm to determine the then current memory addresses for the related data (410). Accordingly, the dispersion algorithm must be predictable so that the related data can be retrieved. In one embodiment the dispersion algorithm is dynamically changed. In this embodiment, however, predictability must be maintained or the retrieval of the related data will not occur. The related data is then retrieved from the memory addresses as determined by the dispersion algorithm (412). It is then determined if any of the related data has become corrupted (414). If it has not, the process ends. If some of the data has become corrupted, corrective measures are applied (416). The corrective measures may include treating the affected data as noise or implementing correction algorithms.

Generally, the address randomizer in embodiments of the present invention may be implemented in digital electronic circuitry, or with a programmable processor (for example, a special-purpose processor or a general-purpose processor such as a computer) firmware, software, or in combinations thereof. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A memory system, the system comprising:
   a memory configured to store strings of data;
   a central processing unit (CPU) configured to direct the storing and retrieving of the strings of data from the memory at select memory addresses; and
   an address randomizer coupled between the CPU and the memory, the address randomizer is configured to dynamically disperse the strings of data throughout locations of the memory by changing the select memory addresses directed by the CPU based on a dynamically changing dispersion algorithm.

2. The system of claim 1, further comprising:
   a CPU data link coupled to provide a data path between the CPU and the address randomizer;
   a randomizer data link coupled to provide a data path between the address randomizer and the memory;
   a CPU address link coupled to provide an address path between the CPU and the memory; and
   a randomizer address link coupled to provide a randomized address between the address randomizer and the memory.

3. The system of claim 1, wherein the address randomizer is made of at least one of software and hardware.

4. The system of claim 1, wherein the address randomizer further comprises:
   the dynamically changing dispersion algorithm configured to generate addresses.

5. The system of claim 1, wherein the address randomizer is internal to a processing system that includes the CPU.

6. The system of claim 5, wherein the address randomizer is part of a direct memory access (DMA) engine.

7. An address randomizer, the randomizer comprising:
   a first data port configured to receive and pass data from and to a processing unit;
   a second data port configured to pass and receive data stored in a memory;
   a first address port configured to pass memory addresses from the processing unit;
   a dynamically changing dispersion algorithm configured to dynamically disperse memory addresses associated with strings of data from the processing unit throughout the memory; and
   a second address port configured to pass the dynamically dispersed memory addresses to the memory.

8. The address randomizer of claim 7, wherein the dynamically changing dispersion algorithm disperses the addresses by at least one of interleaving, scrambling, and organized randomization.

9. The address randomizer of claim 7, wherein the dynamically changing dispersion algorithm is predictable.

10. The address randomizer of claim 7, wherein addressing is dynamically set to one of standard allocation for single data and specific blocks of data allocation.

11. The address randomizer of claim 7, wherein the dynamic allocation is implemented internally by a direct memory access (DMA) engine.

12. A method operating a memory system, the method comprising:
    directing the storage of related data at select sequential memory addresses in a memory with a processing unit; and
    dynamically randomizing the select sequential memory addresses so the related data is stored throughout physical locations of the memory based on a dynamically changing dispersion algorithm.

13. The method of claim 12, wherein randomizing the select sequential memory addresses further comprises:
    applying the dynamically changing dispersion algorithm to the select sequential memory addresses.

14. The method of claim 12, further comprising:
    communicating the select sequential memory address to an address randomizer.

15. The method of claim 12, further comprising:
    requesting the related data at the select memory addresses with the processing unit; and
    retrieving the related data.

16. The method of claim 15, further comprising:
    treating corrupted data of the related data as noise.

17. The method of claim 15, further comprising:
    applying a correction algorithm to corrupted data in the related data.

18. The method of claim 15, wherein retrieving the related data further comprises:
    applying the select sequential memory addresses to the dynamically changing dispersion algorithm to determine the location of the related data stored in the memory.

* * * * *